(12) United States Patent
Lee

(10) Patent No.: US 7,668,236 B2
(45) Date of Patent: Feb. 23, 2010

(54) MULTI-STAGE CABLE EQUALIZER

(75) Inventor: Jiunn-Yih Lee, Hsinchu (TW)

(73) Assignee: Mstar Semiconductor, Inc., Hsinchu (TW)

( * ) Notice: Subject to any disclaimer, the term of this patent is extended or adjusted under 35 U.S.C. 154(b) by 590 days.

(21) Appl. No.: 11/293,201

(22) Filed: Dec. 5, 2005

(65) Prior Publication Data

US 2006/0121860 A1    Jun. 8, 2006

(30) Foreign Application Priority Data

Dec. 7, 2004    (TW)    ............... 93137714 A

(51) Int. Cl.
*H03H 7/00*    (2006.01)
(52) U.S. Cl. ............................................ 375/229
(58) Field of Classification Search ............... 375/229, 375/230, 232, 233, 234
See application file for complete search history.

(56) References Cited

U.S. PATENT DOCUMENTS

| 4,928,071 | A | * | 5/1990 | Yamamoto et al. | ........... 330/129 |
| 5,841,810 | A | * | 11/1998 | Wong et al. | ................. 375/232 |
| 5,844,941 | A | | 12/1998 | Mack et al. | ................. 375/232 |
| 2004/0041598 | A1 | * | 3/2004 | Taki et al. | .................... 327/113 |

FOREIGN PATENT DOCUMENTS

| CN | 1098539 | 2/1995 |
| CN | 1114488 | 1/1996 |

* cited by examiner

*Primary Examiner*—Kevin M Burd
(74) *Attorney, Agent, or Firm*—WPAT., P.C.; Justin King

(57) ABSTRACT

The present invention discloses a multi-stage cable equalizer, comprising a fixed gain device and an adjustable gain device. The fixed gain device compensates the loss caused by the cable at a major band, and the adjustable gain device further compensates the loss at adjusted bands. The multi-stage cable equalizer of the present invention exhibits advantages in design flexibility and reduced cost.

8 Claims, 4 Drawing Sheets

MULTI-STAGE CABLE EQUALIZER

BACKGROUND OF THE INVENTION

1. Field of the Invention

The present invention generally relates to a cable equalizer and, more particularly, to a multi-stage cable equalizer.

2. Description of the Prior Art

With the arrival of the information era, the Internet has become the most important media that carries information of video, audio, data and so forth. Therefore, the attenuation loss of the transmission cable becomes an important issue in the industry.

When information data is transmitted on a cable at high frequencies, the equivalent impedance of the cable results in attenuation loss in response to the transmission distance. In other words, the attenuation loss increases as the transmission distance and the frequency increase.

Please refer to FIG. 1, which is a diagram showing the frequency response of a transmission cable depending on the cable length. In FIG. 1, different lengths of cables result in different attenuation on the transmission signal. More particularly, larger attenuation in gain appears for a long cable at high frequencies.

In order to compensate the loss with the increase of distance at high frequencies, it is usually that an equalizer is placed at the receiving end of a transmission system to reconstruct the transmitted signal over the cable.

FIGS. 2A, 2B and 2C show the frequency response of the transmission cable, the frequency response of an equalizer and the frequency response of the transmitted signal over the cable after passing through the equalizer, respectively. In FIG. 2A, different lengths of cables result in different attenuation on the transmitted signal. Therefore, an equalizer for long cables and an equalizer for short cables with frequency response as shown in FIG. 2B can be used to compensate the loss in the long cable and the short cable, respectively. FIG. 2C shows that the attenuation loss is compensated for both the long and the short cables by using the equalizers for long cables and short cables. Therefore, the transmitted signal can be constructed using the appropriate equalizers for both the long and the short cables.

In general, cable equalizers can be divided into the fixed gain equalizer and the adjustable gain equalizer. The fixed gain equalizer only compensates the loss in response to a fixed frequency range, for example, the frequency range higher than a fixed frequency. And then, the adjustable gain equalizer compensates the loss in response to different frequencies. Therefore, the fixed gain equalizer has less flexibility than the adjustable gain equalizer. However, the former costs less and is easier to fabricate, hence exhibiting higher reliability.

Therefore, there is need in providing a multi-stage cable equalizer so as to compensate the loss caused by the transmission cable in response to its length while achieving better compensation and reduced cost.

SUMMARY OF THE INVENTION

It is a primary object of the present invention to provide a multi-stage cable equalizer so as to compensate the loss caused by the transmission cable in response to its length.

It is a secondary object of the present invention to provide a multi-stage cable equalizer so as to achieve better compensation and reduce the cost.

In order to achieve the foregoing object, the present invention provides a multi-stage cable equalizer, comprising: a fixed gain device, compensating a transmitted signal over a cable; and an adjustable gain device, coupled to the fixed gain device, compensating the transmitted signal.

It is preferable that the fixed gain device comprises: a first gain amplifier, amplifying the transmitted signal so as to output a first amplified signal; a fixed filtering device, filtering the transmitted signal so as to output a first filtered signal; and a first synthesizing device, synthesizing the first amplified signal and the first filtered signal.

It is preferable that the adjustable gain device comprises: a second gain amplifier, amplifying the transmitted signal so as to output a second amplified signal; an adjustable filtering device, filtering the transmitted signal so as to output a second filtered signal; and a second synthesizing device, synthesizing the second amplified signal and the second filtered signal.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention providing a multi-stage cable equalizer can be exemplified by the preferred embodiments as described hereinafter.

Figure 1:
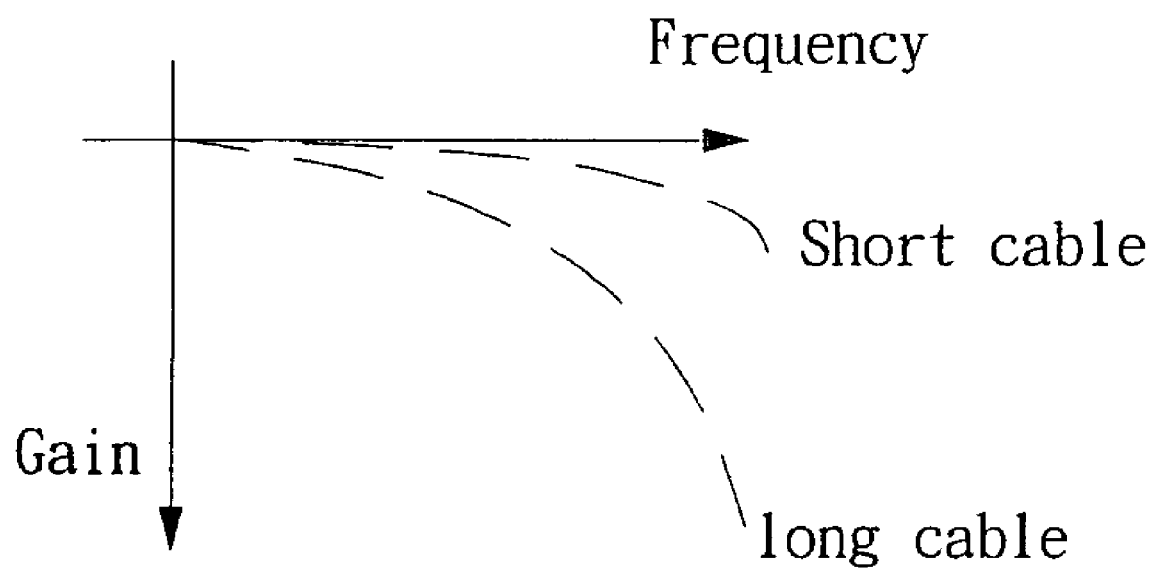
FIG. 1 is diagram showing the frequency response of a transmission cable depending on the cable length.
Figure 2:
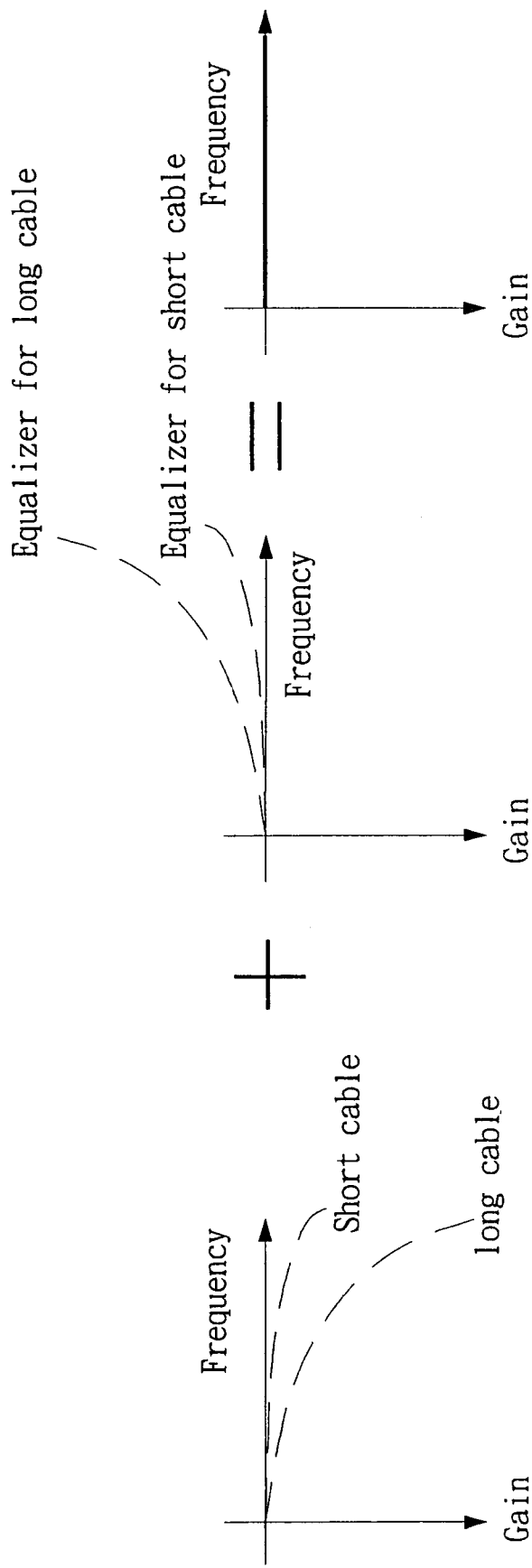
FIG. 2A shows the frequency response of the transmission cable.
FIG. 2B shows the frequency response of an equalizer.
FIG. 2C shows the frequency response of the transmitted signal over the cable after passing through the equalizer.
Figure 3:
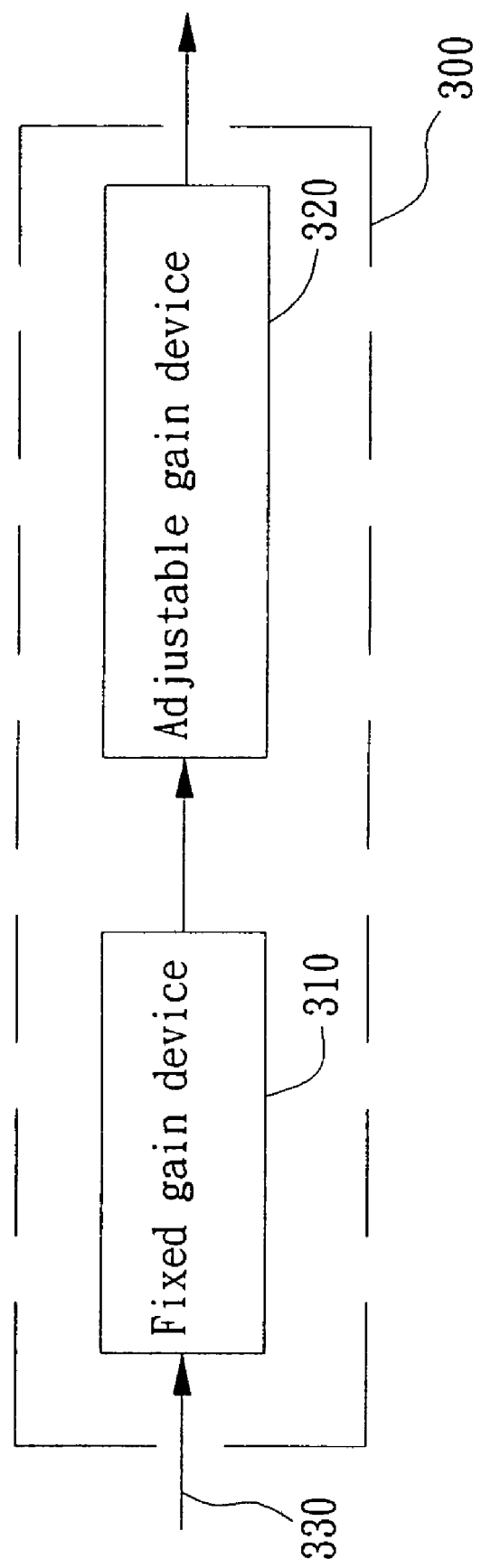
FIG. 3 is a schematic diagram showing a multi-stage cable equalizer in accordance with one preferred embodiment of the present invention.

Please refer to FIG. 3, which is a schematic diagram showing a multi-stage cable equalizer in accordance with one preferred embodiment of the present invention. The multi-stage cable equalizer 300 comprises a fixed gain device 310 and an adjustable gain device 320. In the present invention, the fixed gain device 310 compensates the loss in a cable signal 330 at the major band and then the adjustable gain device 320 compensates the loss at respective bands (preferably higher frequency bands of the major band).

In the preferred embodiment of the present invention, the low-cost and easy-to-manufacture fixed gain device 310 is used to compensate the loss in a cable signal 330 at the major band so as to reduce the cost and improve the reliability. On the contrary, in the prior art, at least two high-cost and complicated adjustable gain devices are required to compensate the loss not only at the major band but also in respective bands.

Therefore, in the present invention, the multi-stage cable equalizer 300 comprising a fixed gain device 310 and an adjustable gain device 320 costs less than the prior art that uses at least two adjustable gain devices. Moreover, the adjustable gain device 320 of the multi-stage cable equalizer 300 in the present invention compensates the loss in the cable signal 330 in response to respective bands so as to remain flexibility as in the prior art.

Figure 4:
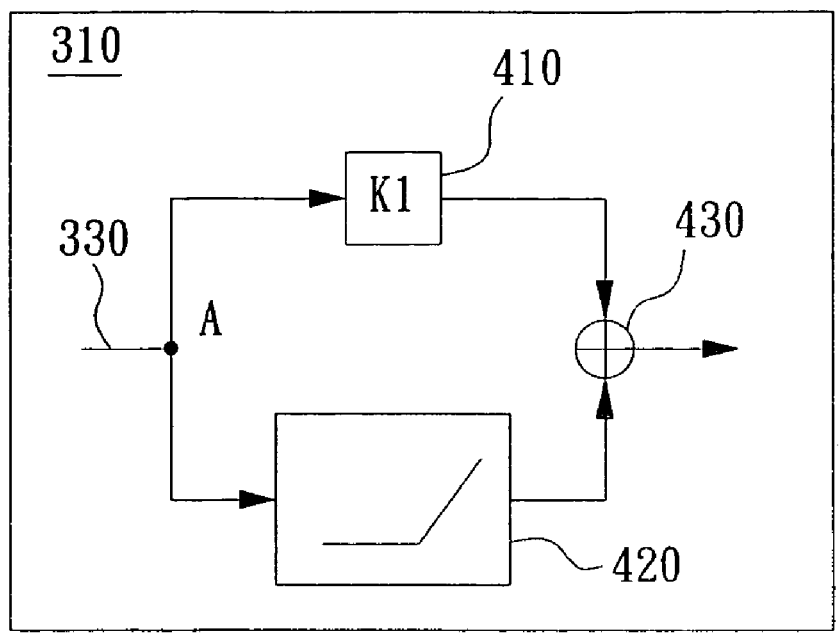
FIG. 4 is a schematic diagram showing a fixed gain device in accordance with one preferred embodiment of the present invention.

FIG. 4 is a schematic diagram showing a fixed gain device in accordance with one preferred embodiment of the present invention. In the preferred embodiment of the present invention, the fixed gain device 300 comprises a gain amplifier (K1) 410, a fixed high-pass (HP) filter 420 and an adder 430. At node A, the cable signal 330 is received simultaneously by the gain amplifier 410 and the fixed high-pass filter 420. The gain amplifier 410 amplifies the cable signal 330 so as to output an amplified signal and the fixed high-pass filter 420 filters out the low frequency part of the cable signal 330 so as to output a filtered signal. The adder 430 synthesizes the amplified signal and the filtered signal so that the cable signal 330 is amplified and the loss in the cable signal 330 is compensated in response to high frequency band.

Figure 5:
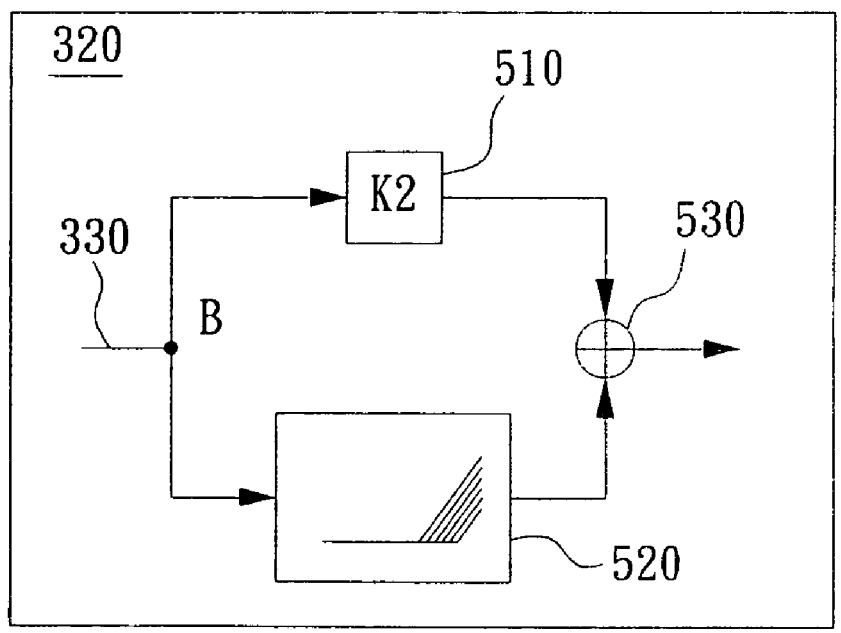
FIG. 5 is a schematic diagram showing an adjustable gain device in accordance with one preferred embodiment of the present invention.

Please further refer to FIG. 5, which is a schematic diagram showing an adjustable gain device in accordance with one preferred embodiment of the present invention. In the preferred embodiment of the present invention, the adjustable gain device 320 comprises a gain amplifier (K2) 510, an adjustable high-pass (HP) filter 520 and an adder 530. Similarly, the cable signal 330 is received simultaneously by the gain amplifier 510 and the adjustable high-pass filter 520. The gain amplifier 510 amplifies the cable signal 330 so as to output an amplified signal and the adjustable high-pass filter 520 filters out the low frequency part of the cable signal 330 so as to output a filtered signal. The adder 530 synthesizes the amplified signal and the filtered signal so that the cable signal 330 is amplified and the loss in the cable signal 330 is compensated in response to high frequency band. Moreover, the adjustable high-pass filter 520 has an adjustable filtering level; and therefore, the adjustable gain device 320 compensates the loss of the cable signal 330 at different high frequency bands.

According to the above discussion, it is apparent that the present invention discloses a multi-stage cable equalizer comprising a fixed gain device and an adjustable gain device. The multi-stage cable equalizer compensates the loss in the cable signal at the major band using the fixed gain device and compensates the loss at respective bands using the adjustable gain device. Therefore, the multi-stage cable equalizer is capable of compensating the loss caused by the transmission cable in response to its length while achieving design flexibility and reduced cost.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A multi-stage cable equalizer, comprising:
   a fixed gain device, receiving and compensating an input signal to generate a first output signal, wherein the fixed gain device comprises:
      a first gain amplifier, amplifying the input signal to generate a first amplified signal;
      a first fixed filtering device, filtering the input signal to generate a first filtered signal; and
      a first synthesizing device, synthesizing the first amplified signal and the first filtered signal to generate the first output signal; and
   an adjustable gain device, serially coupled to said fixed gain device to receive the first output signal, compensating the first output signal to generate a second output signal, wherein the adjustable gain device comprises:
      a second gain amplifier, amplifying the first output signal to generate a second amplified signal;
      a second adjustable filtering device, filtering the first output signal to generate a second filtered signal; and
      a second synthesizing device, synthesizing the second amplified signal and the second filtered signal to generate the second output signal.

2. The multi-stage cable equalizer as recited in claim 1, wherein said
   first gain amplifier, amplifying said first output signal with a fixed gain so as to output the first amplified signal.

3. The multi-stage cable equalizer as recited in claim 2, wherein said first fixed filtering device is a filter having a fixed filtering level.

4. The multi-stage cable equalizer as recited in claim 2, wherein said first fixed filtering device is a fixed high-pass filter.

5. The multi-stage cable equalizer as recited in claim 2, wherein said first synthesizing device is an adder.

6. The multi-stage cable equalizer as recited in claim 1, wherein said second adjustable filtering device is a filter having an adjustable filtering level.

7. The multi-stage cable equalizer as recited in claim 1, wherein said second adjustable filtering device is an adjustable high-pass filter.

8. The multi-stage cable equalizer as recited in claim 1, wherein said second synthesizing device is an adder.

\* \* \* \* \*